(12) United States Patent
Levy et al.

(10) Patent No.: US 6,490,023 B1
(45) Date of Patent: Dec. 3, 2002

(54) PROCESSING APPARATUS AND METHOD FOR DETERMINING OPTIMUM PROCESSING CHARACTERISTICS OF THERMAL DEVELOPABLE FILM

(75) Inventors: David H. Levy, Rochester, NY (US); Mark E. Irving, Rochester, NY (US); James H. Reynolds, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/592,880

(22) Filed: Jun. 13, 2000

(51) Int. Cl.[7] .................. G03B 27/32; G03B 27/52; G03B 13/00
(52) U.S. Cl. .................. 355/27; 355/40; 396/575
(58) Field of Search .................. 355/25, 82, 27, 355/28, 29, 40, 41; 347/17; 396/569, 576, 575

(56) References Cited

U.S. PATENT DOCUMENTS

| | | | |
|---|---|---|---|
| 3,680,463 A | * | 8/1972 | Attridge et al. ............ 396/569 |
| 4,021,240 A | | 5/1977 | Cerquone et al. |
| 4,832,275 A | | 5/1989 | Robertson |
| 4,834,306 A | | 5/1989 | Robertson et al. |

(List continued on next page.)

FOREIGN PATENT DOCUMENTS

| | | |
|---|---|---|
| EP | 0 546 190 | 6/1993 |
| EP | 0 679 946 | 11/1995 |
| EP | 0 751 420 | 1/1997 |
| EP | 0 770 905 | 5/1997 |

OTHER PUBLICATIONS

Research Disclosure vol. 170, 6/78, Item #17029 and vol. 299, 3/89, Item #299631.

USSN 09/592,818 filed Jun. 13, 2000, titled Image Forming Assembly and Method Using Lamination Apparatus by Richard P. Szajewski and Wanda K. Swartz (81029).

(List continued on next page.)

*Primary Examiner*—Russell Adams
*Assistant Examiner*—Peter B. Kim
(74) *Attorney, Agent, or Firm*—David A. Novais

(57) ABSTRACT

A method and apparatus for processing thermal film includes a process sequence that involves a pre-process of a portion of a thermal film to determine optimal conditions for a subsequent process for developing images on the film. In a first feature of the invention, the thermal film undergoes a pre-process for determining the requirements of the subsequent full process of the thermal film. During the pre-process, a portion of the film, preferably before or after an area in which images are captured is used as a process test area. Thereafter, processing during a subsequent processing as well as scanning conditions can be modified based on the optimum processing characteristics determined during the pre-process. In a second feature of the invention, the process sequence can include a pre-process of the entire film and an infrared scanning of the entire film to determine optimal processing conditions for the second process for developing the image. In the latter feature, the entire film is processed at a minimum temperature, and scanned at an illumination wavelength that does not cause imagewise exposure. The results of scanning can be used to interpret physical characteristics of the film. This information can be used to determine for example, the temperature and the time of the subsequent process to allow for optimum extraction of information from the film.

36 Claims, 2 Drawing Sheets

U.S. PATENT DOCUMENTS

| | | |
|---|---|---|
| 4,965,628 A | 10/1990 | Olliver et al. |
| 5,003,334 A | 3/1991 | Pagano et al. |
| 5,032,854 A | 7/1991 | Smart et al. |
| 5,215,874 A | 6/1993 | Sakakibara |
| 5,229,585 A | 7/1993 | Lemberger et al. |
| 5,563,717 A | 10/1996 | Koeng et al. |
| 5,587,767 A | 12/1996 | Islam et al. |
| 5,644,647 A | 7/1997 | Cosgrove et al. |
| 5,649,260 A | 7/1997 | Wheeler et al. |
| 5,667,944 A | 9/1997 | Reem et al. |
| 5,698,365 A | 12/1997 | Taguchi et al. |
| 5,840,475 A | 11/1998 | Levy et al. |
| 5,973,712 A * | 10/1999 | Agano .................. 347/188 |
| 5,986,238 A * | 11/1999 | Struble .................. 219/216 |
| 5,999,204 A * | 12/1999 | Kojima .................. 347/194 |
| 6,018,355 A * | 1/2000 | Kuwabara ............. 347/188 |
| 6,021,277 A | 2/2000 | Sowinski et al. |
| 6,048,110 A | 4/2000 | Szajewski et al. |
| 6,054,263 A | 4/2000 | Danssaert et al. |
| 6,062,746 A * | 5/2000 | Stoebe et al. ............ 396/575 |
| 6,072,513 A * | 6/2000 | Agano .................. 347/188 |

OTHER PUBLICATIONS

USSN 09/592,816 filed Jun. 13, 2000, titled An Image Processing and Manupulation System by Richard P. Szajewski, Allan F. Sowinski and John D. Buhr (81040).

USSN 09/592,243 filed Jun. 13, 2000, titled An Image Processing Apparatus and Method for Thermally Processed Films by James H. Reynolds, David H. Levy and Mark E. Irving (81076).

USSN 09/592,922 filed Jun. 13, 2000, titled A Thermal Film Having at Least Two Imaging Layers With Different Processing Characteristics and a Method of Forming and Processing the Same by Gary L. House and David H. Levy (81093).

USSN 09/ 09/592,836 filed Jun. 13, 20000, titled A Thermal Processing System and Method Including a Kiosk by David H. Levy, Richard P. Szajewski, Mark E. Irving, Lyn M. Irving (81094).

USSN 09/592,814 filed Jun. 13, 2000, titled A Thermal Processor and Method Adapted to Process a Film Containing a Resistive Heating Element, and a Film Containing Such an Element by David H. Levy (81095).

\* cited by examiner

PROCESSING APPARATUS AND METHOD FOR DETERMINING OPTIMUM PROCESSING CHARACTERISTICS OF THERMAL DEVELOPABLE FILM

FIELD OF THE INVENTION

The present invention relates to a method and apparatus for processing thermal developable film. It particularly relates to a method and apparatus for employing a pre-process on the film to determine optimal conditions for a subsequent process.

BACKGROUND OF THE INVENTION

In the conventional practice of color photography, silver halide film is developed by a chemical technique, requiring several steps consisting of latent image developing, bleaching, and fixing. While this technique has been developed over many years and results in exceptional images, the technique requires several liquid chemical solutions and precise control of times and temperatures of development. Further, the conventional silver halide chemical development technique is not particularly suitable for utilization with a compact developing apparatus. The chemical technique which is a wet processing technique also is not easily performed in the home or small office. Imaging systems that do not rely on conventional wet processing have received increased attention in recent years. Photothermographic imaging systems have been employed for producing silver images.

A method and apparatus for developing a heat developing film is disclosed in U.S. Pat. No. 5,587,767 to Islam et al. Summaries of photo thermographic imaging systems are published in Research Disclosure, Vol. 170, June 1978, Item 17029, and Vol. 299, March 1989, Item 29963.

Heat development color photographic materials have been disclosed in U.S. Pat. No. 4,021,240 to Cerquone et al and U.S. Pat. No. 5,698,365 to Taguchi et al, and commercial products such as Color Dry Silver supplied from Minnesota Mining and Manufacturing Co. and PICTROGRAPHY™ and PICTROSTAT™ supplied by Fuji Photo Film Co., Ltd. are known. Furthermore, U.S. Pat. No. 5,840,475 discloses an imaging element capable of providing a retained viewable image when imagewise exposed and heated.

A recent innovation in color negative film has made use of a thrust cartridge. Such cartridges are disclosed in U.S. Pat. No. 4,834,306 to Robertson et al and U.S. Pat. No. 5,003,334 to Pagano et al. The film contained in such a thrust cartridge may contain a magnetic layer that allows recording of information during manufacture, exposure, and development of the film. Such film is disclosed in U.S. Pat. No. 5,215,874 to Sakakibara. The film and cartridge may contain additional provisions for data storage such as DX bar code data and frame number bar code data. Such elements are disclosed in U.S. Pat. Nos. 5,032,854, 5,229,585, and 4,965,628. The thrust cartridge may also be made light-tight so that unexposed or imagewise exposed film that has been rewound into the cartridge may be stored without further exposure of the film within the cartridge. These thrust cartridge films have the advantage that they may be more easily manipulated for copying, digital reading, and storage.

U.S. Pat. No 6,048,110 to Szajewski et al. illustrates a further example of an apparatus for thermal development of thermal film using a thrust cartridge, with the apparatus including a magnetic reader and writer.

Writing of reference patches onto film to improve imaging system performance is known in the art. Such techniques for conventional wet process films are disclosed for example in U.S. Pat. No. 5,667,944—Reem et al. Similar techniques for dry process films are disclosed in U.S. application Ser. No. 09/206,914 filed Dec. 7, 1998. Further calibration patches are described in more detail by Wheeler et al U.S. Pat. No. 5,649,260, Koeng at al U.S. Pat. No. 5,563,717, by Cosgrove et al U.S. Pat. No. 5,644,647 and in combination with films intended for scanning by Sowinski et al U.S. Pat. No. 6,021,277.

A drawback with traditional approaches to processing film is that they do not provide for a consistent and accurate method of determining optimal processing conditions for thermally developed film.

SUMMARY OF THE INVENTION

The present invention provides for a method and apparatus for processing images, in which a pre-process of the film is used to determine optimum processing characteristics of the film for a subsequent second process.

The method of the present invention includes a first processing step of processing a thermal film to determine optimum processing characteristics of the thermal film; and a second processing step of processing the thermal film based on the optimum processing characteristics determined in the first processing step to develop images on the film.

The present invention further provides for an image processing system that comprises a processing section that is adapted to perform a test process on a thermal film to determine optimum processing characteristics of the thermal film and provide a processing signal indicative thereof. The processing section is further adapted to perform a subsequent full process on the thermal film to develop images on the film. The image processing assembly also comprises a controller that receives the processing signal and is adapted to modify the subsequent full processing of the film based on the determined optimum processing characteristics.

The invention further relates to processing method that comprises the steps of processing a thermal film at a minimum process temperature; scanning the processed thermal film at an illumination wavelength that does not cause an imagewise exposure of the film; determining optimum processing characteristics of the film based on information obtained from the scanning step; and performing a subsequent processing of the film based on the determined optimum processing characteristics.

The present invention further relates to a processing system that comprises a processing section adapted to process a photosensitive film at a minimum process temperature and is further adapted to perform a subsequent processing on the film to develop images on the film; a scanner that scans the film after the film has been processed at the minimum process temperature and before the film is subjected to the subsequent process to determine optimum processing characteristics of the film; and a controller adapted to modify the subsequent processing based on the determined optimum characteristics.

The present invention further relates to a film and processing system in which the film contains a test pattern that can be exposed during manufacture or prior to processing. The test pattern can be located on the film in an area that can be subjected to any suitable processing condition, including the low temperature initial process or the subsequent optimum processing temperature. Optical information extracted from the process test pattern can then be used to modulate a subsequent thermal process or modulate the digital image processing of the scanned images.

DETAILED DESCRIPTION OF THE INVENTION

Figure 1:
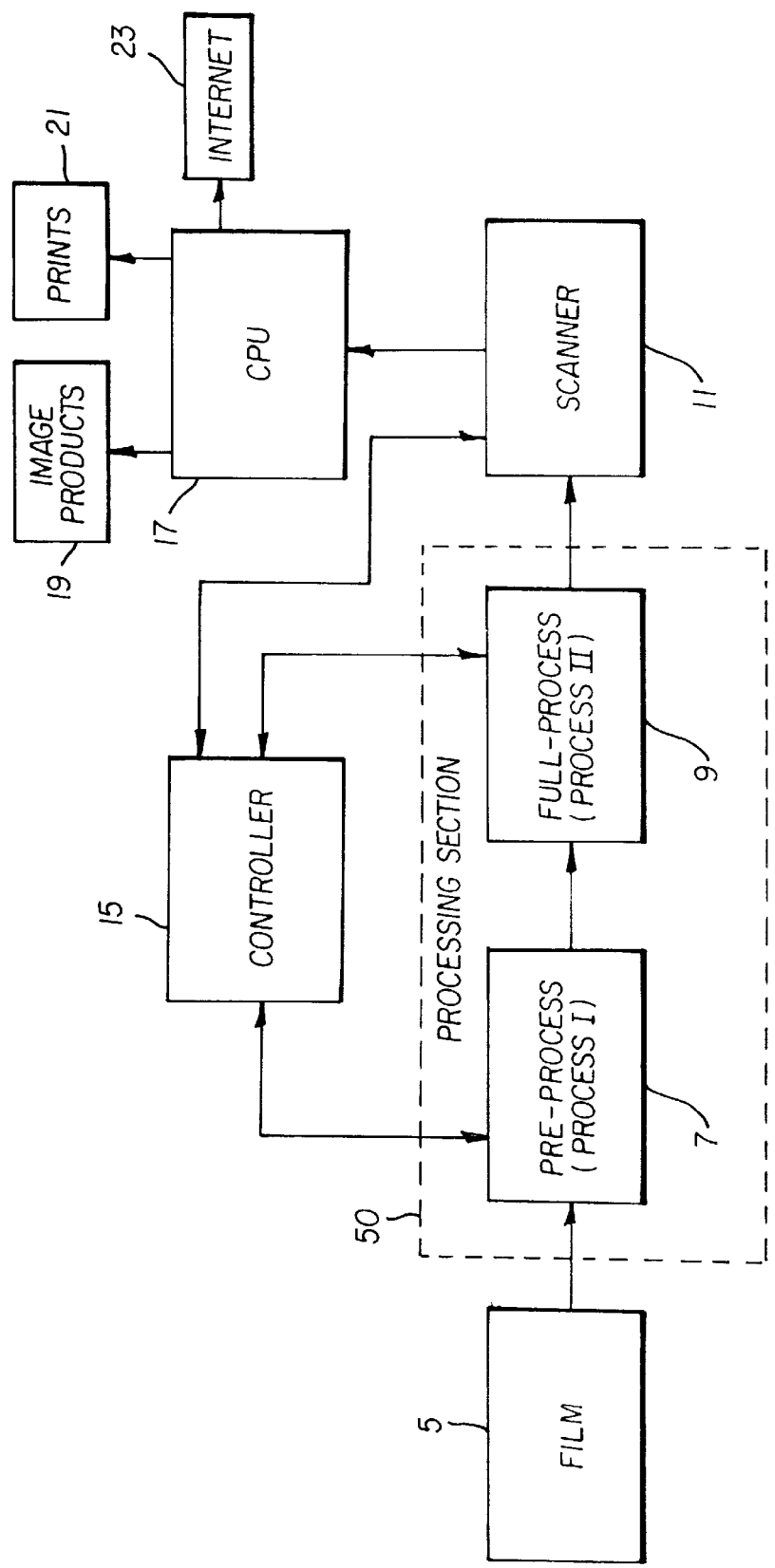
FIG. 1 schematically illustrates a processing system and method in accordance with a first embodiment of the present invention.

Referring now to the drawings, wherein like reference numerals represent identical or corresponding parts throughout the several views, FIG. 1 illustrates a first embodiment of the method and apparatus of the present invention. More specifically, FIG. 1 schematically illustrates a thermal processing system for processing thermal film according to the first embodiment. As shown in FIG. 1, a film cassette which can include a roll of exposed thermal film 5 in a thrust cartridge, as described in, for example, U.S. Pat. No. 6,048,110, is conveyed to a processing section 50. Processing section 50 can include a pre-process arrangement 7 and a full-process arrangement 9. It is noted that pre-process arrangement 7 and full-process arrangement 9 could be integrated into a single processor, or could be separate processors. Processing section 50 including pre-process arrangement 7 and full-process arrangement 9 involves the use of a heating system for thermal development. The heating system can be any suitable type of heater. For example, the heater can be a radiant heater, heated liquid, heated air, dielectric, microwave conduction and/or convection. In one feature of the invention, the heater can be a resistive heater in the form of a plate or a drum as it provides maximum transfer efficiency to heat the exposed thermal film 5.

The thrust cartridge may be any cartridge that allows film to be withdrawn from the cartridge and rewound onto the cartridge multiple times while providing light-tight storage, particularly prior to exposure and development. Typical of such cartridges are those utilized in the advanced photo system (APS) for color negative film. These cartridges are disclosed in U.S. Pat. No. 4,834,306 to Robertson et al and U.S. Pat. No. 4,832,275 to Robertson.

The thermal film utilized in the invention may be any photothermographic film that provides satisfactory images. Typical films are full color thermal photothermographic films such as disclosed in U.S. Pat. No. 5,698,365 to Taguchi et al. A typical photothermographic film provides light sensitive silver halides, compounds that form dyes, compounds that release dyes, couplers as dye donating compounds, reducing agents, and binders on supports. A typical film may also contain organic metal salt oxidizing agents and antifoggants.

Also disclosed in the system of FIG. 1 is a scanner 11 which scans the thermally processed film to create a digital record file of the images on the film. After scanning, the images and data with respect to the images can be supplied to a CPU, processor or image data manager 17. CPU 17 can be adapted to provide the images to a printer 21 for printing, can forward the images to a location to produce image products 19 in the form of, for example, Photo CDs, or can be linked to a network service provider 23 such as the Internet.

The system of FIG. 1 further includes a controller or control mechanism 15 which can control pre-process arrangement 7, full process arrangement 9, scanner 11 and CPU 17 in accordance with features of the present invention which will now be described.

In a first feature of the invention, a process sequence employing a pre-process of a small portion of film 5 as, for example, a function of temperature and time is employed to determine an optimal second-step process.

The process sequence of FIG. 1 employs a test process or pre-process arrangement 7 (Process I) to determine the requirements for a subsequent full process via full process arrangement 9 (Process II) of thermally processed film 5 for developing images on the film. A portion of film 5, preferably before or after an area on which images are captured, can be used as a process test area in pre-process arrangement 7. This area may be blank or may contain a reference exposure that can be applied during film manufacture or at the time of processing. This area can be processed thermally (Process I at pre-process arrangement 7) and read by controller 15 to determine the current quality of film 5, and as an aid to determine optimum processing characteristics such as the optimum thermal processing at full process arrangement 9 (Process II), optimum scanner operation for scanner 11, and optimum image processing for the subsequent processing at full process arrangement 9 (Process II) of the image containing portions of the film.

That is, once pre-processing occurs at pre-processing arrangement 7, a signal indicative of the optimum processing characteristics of film 5 can be sent to controller 15 or controller 15 can be adapted to read film 5 after process I. Controller 15 is further adapted to modify the subsequent full process at full-process arrangement 9 for image development, as well as modify scanner operations at scanner 11 for the subsequent digital manipulation of the digital images in a manner which will now be described.

As an example, process II may be modified based on a signal from controller 15 by changing the time or temperature of the process. The scanner operation of scanner 11 may be modified based on the signal from controller 15 by changing the power or spectral characteristics of an illuminator, or the properties of the sensing device of the scanner such as integration time. The properties of the digital image processing to the digital record file of the scanned images may be modified to account for color balances, density variations, and anticipated noise positions of the film.

The test process at pre-process arrangement 7 (Process I) may take the form of a single exposure to a specified time and temperature, after which film densities are read by sampling transmitted radiation, preferably those in the range of 350 nm to 900 nm. Alternatively, due to the simplicity of the thermal process, the test process at pre-process arrangement 7 may take the form of several thermal processes with sampling of film development between these processes. In order to implement this sequential testing procedure, the sample of film during the intervals would need to be examined with radiation to which the film is not sensitive, notably IR radiation. This route would allow for improved information gathering and the potential to tailor the thermal processes based on the information gathered in preceding processes.

It is also anticipated that multiple processing conditions could be applied to the film at once, eliminating the sequential testing above. This would require pre-process arrangement 7 to take the form of a gradient heater, where a spectrum of temperatures are applied to the film at once. Gradient heaters are known in the art for purposes other than thermal development of film. For example, the gradient heater disclosed in U.S. Pat. No. 6,054,263 to Danssaert et al. could be adapted for the purposes of the current invention. In this case, an optimum processing temperature could be chosen for the gradient of temperatures. In addition, because the pre-processed sample conditions are accomplished at one time, the film could be examined with radiation to which the film is sensitive, notably the visible spectrum from 350 to 700 nm.

In like manner, multiple and simultaneous processing conditions could be created in pre-process arrangement 7 by employing a continuously variable processing time at a constant temperature. This could be accomplished with a variable film transport rate over a heated platen or drum, a rotating heated surface shaped like a cam, a mechanism to separate a heated surface from the film after the film has been transported into a heated slot at a constant rate, a variable rotating speed nozzle of heated air, and other similar approaches. It must be appreciated that a combination of gradient temperatures and gradient processing times could also advantageously be produced within a single device.

Figure 2:
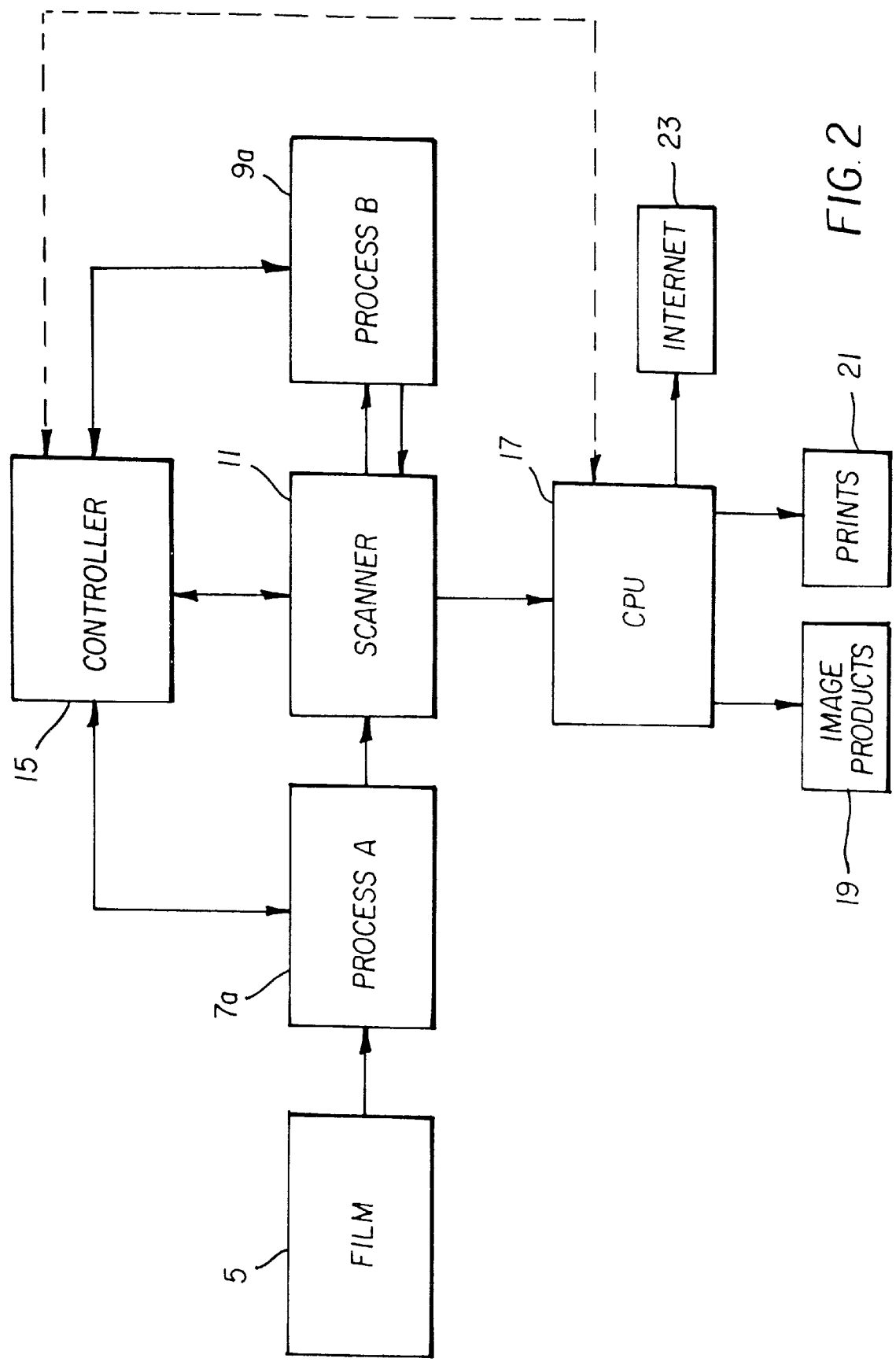
FIG. 2 schematically illustrates a processing system and method in accordance with a second embodiment of the present invention.

In a further feature of the invention as schematically illustrated in FIG. 2, a process sequence involving a pre-process of the entire film at low temperature, and infrared scanning of the entire film to determine an optimal second process is performed. More specifically, the entire film 5 may be processed at a minimum anticipated process temperature of approximately 90° C. to 160° C. at processing arrangement 7a (Process A) and scanned at scanner 11 by an illumination wavelength that does not cause imagewise exposure. The results of scanning the entire film 5 can be used to interpret physical characteristics of the film, as well as characteristics of the images contained on the film such as extent of under or over exposure. This information can be used to determine the temperature and time of a subsequent process at processing arrangement 9a (Process B) to allow for the optimum extraction of information from the film and the development of images on the film. Typically, if a second process of the film is required it will be at a temperature ranging from 1° to 15° C. above the initial process temperature.

In the embodiment of FIG. 2, controller 15 is adapted to receive a signal from scanner 11 reflective of the processing characteristics of the film and thereafter, control process B at processing arrangement 9a based on this information.

Further, although processing arrangement 7a and processing arrangement 9a are shown separate, they can make up a part of a single processor, or can be located at different locations. In addition, controller 15 and CPU 17 could advantageously be combined into a single entity.

As in the embodiment of FIG. 1, scanner 11 produces a digital record of the images on film 5, and sends the digital record to CPU 17, which is adapted to control a printer 21 for producing photographic prints, or provide instructions with respect to the creation of image products 19 such as photos CDs. As a further option, the signals can be sent via a network service provider 23 such as the Internet.

The following are two examples of a process sequence in accordance with the embodiment of FIG. 2:

Example 1: If the scan after Process A shows that the film Dmin (minimum density) is normal (i.e., keeping is not bad), but that the density formation in the image frames is generally low, indicative of underexposure, Process B can be increased in temperature or duration to compensate for the underexposures.

Example 2: If the scan after Process A shows that the film Dmin (minimum density) is high, indicative of poor keeping, then Process B can be decreased in time or temperature to compensate for the keeping behavior of the film.

In the event that the film processor allows for individual processing conditions for each frame, the second processing of the film can be done on a frame-wise basis to allow each frame of image to receive the precise processing required. Examples of processors capable of such action would be those employing a heating element of small enough length to allow individual processing of image frames.

In a further feature, the test process can be performed on a portion of the film that contains a reference exposure that is applied to the film during manufacture of the film. Also, the test process can be performed on a portion of the film that contains a reference exposure that is applied to the film during the first processing step.

The invention has been described in detail with particular reference to certain preferred embodiments thereof, but it will be understood that variations and modifications can be effected within the spirit and scope of the invention.

What is claimed is:

1. A processing method for processing images, the method comprising:

a first photothermographic heat processing step of thermal processing a photothermographic film to determine optimum photothermographic heat processing characteristics for the photothermographic film; and a second photothermographic heat processing step of thermal processing said photothermographic film based on the optimum photothermographic heat processing characteristics determined in said first photothermographic heat processing step to develop images on said photothermographic film.

2. A method according to claim 1, comprising the further steps of:

adjusting scanner operating conditions of a scanner based on the optimum photothermographic heat processing characteristics determined in said first photothermographic heat processing step;

scanning said photothermographic film after said second photothermographic heat processing step to create a digital image record file representative of the images on said photothermographic film; and processing said digital record file based on the optimum processing characteristics determined in said first photothermographic heat processing step.

3. A method according to claim 1, wherein said first photothermographic heat processing step comprises thermal processing of a reference portion of the photothermographic film which is not in an image area of the photothermographic film.

4. A method according to claim 3, wherein said reference portion is a blank of said photothermographic film.

5. A method according to claim 3, wherein said reference portion comprises a reference exposure that is applied to the photothermographic film during a manufacture of the photothermographic film.

6. A method according to claim 3, wherein said reference portion comprises a reference exposure that is applied to the photothermographic film during said first photothermographic heat processing step.

7. A method according to claim 1, wherein said first photothermographic heat processing step comprises the step of determining a current quality of the photothermographic film.

8. A method according to claim 1, wherein said second photothermographic heat processing step comprises the step of adjusting at least one of a time or temperature of the photothermographic heat process during said second photothermographic heat processing step, based on the image characteristics determined during said first photothermographic heat processing step.

9. A method according to claim 2, wherein said scanner operating conditions include at least one of scanner power and a scanner spectral characteristic.

10. A method according to claim 2, wherein said step of processing said digital image record file comprises modifying at least one of a color balance of images on said film, a tone scale, and a noise position on the film.

11. An image processing system comprising:
a photothermographic heat processing section adapted to perform a test photothermographic heat process on a photothermographic film to determine optimum processing characteristics of the photothermographic film and provide a processing signal indicative thereof, and a subsequent full photothermographic heat process on said photothermographic film to develop images on said photothermographic film; and
a controller which receives said processing signal and is adapted to modify the subsequent full photothermographic heat processing of said photothermographic film based on said determined optimum processing characteristics.

12. An image processing system according to claim 11, further comprising:
a scanner for scanning said fully processed photothermographic film, said controller being adapted to modify scanning operating conditions of said scanner based on said optimum processing characteristics.

13. An image processing system according to claim 11, wherein said test photothermographic heat process is performed on a non-image portion of the photothermographic film.

14. An image processing system according to claim 11, wherein said test photothermographic heat process is performed on a portion of the photothermographic film containing a reference exposure that is applied to the photothermographic film during manufacture of the photothermographic film.

15. An image processing system according to claim 11, wherein said test photothermographic process is performed on a portion of the photothermographic film containing a reference exposure that is applied to the photothermographic film during said test photothermographic heat process.

16. A processing method comprising the steps of:
performing a photothermographic heat processing on a photothermographic film at a minimum process temperature;
scanning said processed photothermographic film at an illumination wavelength that does not cause an imagewise exposure of said photothermographic film;
determining optimum heat processing characteristics of said photothermographic film based on information obtained from said scanning step; and
performing a subsequent photothermographic heat processing of said photothermographic film based on said determined optimum heat processing characteristics.

17. A method according to claim 16, wherein said optimum heat processing characteristics of said photothermographic film comprises information that includes at least physical characteristics of said photothermographic film.

18. A method according to claim 16, wherein said optimum heat processing characteristics of said photothermographic film comprises information that includes at least characteristics of images on said photothermographic film.

19. A processing system comprising:
a photothermographic heat processing section adapted to process a photosensitive film at a minimum process temperature and further adapted to perform a subsequent photothermographic heat processing on said photosensitive film to develop images on said photosensitive film;
a scanner which scans said photosensitive film after said photosensitive film has been processed at the minimum process temperature and before said photosensitive film is subjected to said subsequent photothermographic heat process to determine optimum processing characteristics of said photosensitive film; and
a controller adapted to modify said subsequent photothermographic heat processing based on said determined optimum processing characteristics.

20. A system according to claim 19, wherein said optimum processing characteristics of said photosensitive film comprises information that includes at least physical characteristics of said photosensitive film.

21. A system according to claim 19, wherein said optimum processing characteristics of said photosensitive film comprises information that includes at least characteristics of images on said photosensitive film.

22. A processing method for processing images, the method comprising:
a first photothermographic thermal processing step of processing a heat developable color thermal film having light sensitive material to determine optimum thermal processing characteristics for the thermal film;
second photothermographic thermal processing step of processing said thermal film based on the optimum thermal processing characteristics determined in said first photothermographic thermal processing step to develop images on said thermal film;
adjusting scanner operating conditions of a scanner based on the optimum thermal processing characteristics determined in said first photothermographic thermal processing step;
scanning said thermal film after said second photothermographic thermal processing step to create a digital image record file representative of the images on said thermal film; and
processing said digital record file based on the optimum thermal processing characteristics determined in said first photothermographic thermal processing step.

23. A method according to claim 22, wherein said first photothermographic thermal processing step comprises processing a reference portion of the thermal film which is not in an image area of the thermal film.

24. A method according to claim 23, wherein said reference portion is a blank area of said thermal film.

25. A method according to claim 23, wherein said reference portion comprises a reference exposure that is applied to the thermal film during a manufacture of the thermal film.

26. A method according to claim 23, wherein said reference portion comprises a reference exposure that is applied to the thermal film during said first processing step.

27. A method according to claim 22, wherein said first photothermographic thermal processing step comprises the step of determining a current quality of the thermal film.

28. A method according to claim 22, wherein said second photothermographic thermal processing step comprises the step of adjusting at least one of a time or temperature of the thermal process during said second photothermographic thermal processing step, based on the image characteristics determined during said first photothermographic thermal processing step.

29. A method according to claim 22, wherein said scanner operating conditions include at least one of scanner power and a scanner spectral characteristic.

30. A method according to claim 22, wherein said step of processing said digital image record file comprises modifying at least one of a color balance of images on said thermal film, a tone scale, and a noise position on the thermal film.

31. An image processing system comprising:

photothermographic processing section adapted to perform a test photothermographic process on a heat developable color thermal film having light sensitive material to determine optimum thermal processing characteristics of the thermal film and provide a processing signal indicative thereof, and a subsequent full photothermographic process on said thermal film to develop images on said thermal film;

a controller which receives said processing signal and is adapted to modify the subsequent full photothermographic processing of said thermal film based on said determined optimum thermal processing characteristics; and a scanner for scanning said fully processed thermal film, said controller being adapted to modify scanning operating conditions of said scanner based on said optimum thermal processing characteristics.

32. An image processing system according to claim 31, wherein said test photothermographic process is performed on a non-image portion of the thermal film.

33. An image processing system according to claim 31, wherein said test photothermographic process is performed on a portion of the thermal film containing a reference exposure that is applied to the thermal film during manufacture of the thermal film.

34. An image processing system according to claim 31, wherein said test photothermographic process is performed on a portion of the thermal film containing a reference exposure that is applied to the thermal film during said test photothermographic process.

35. A processing method for processing images, the method comprising:

a first photothermographic thermal processing step of processing a color heat developable thermal film having a light sensitive material to determine optimum processing characteristics for the thermal film;

scanning the film at an illumination wavelength that does not cause imagewise exposure to determine physical and image characteristics of the thermal film; and a second photothermographic processing step of processing said film based on at least one of the optimum processing characteristics determined in said first photothermographic thermal processing step and the physical and image characteristics determined in said scanning step to develop images on said photothermographic film.

36. An image processing system comprising:

a photothermographic processing section adapted to perform a pre-photothermographic process on a color heat developable film having light sensitive material to determine optimum processing characteristics of the film and provide a processing signal indicative thereof, and a subsequent full photothermographic process on said film to develop images on said film;

a scanner for scanning said film after said pre-photothermographic process to determine physical and image characteristics of the film and provide scanning information indicative thereof; and a controller which receives said processing signal and said scanning information and is adapted to modify the subsequent full photothermographic processing of said film based on at least one of said processing signal and said scanning information.

* * * * *